UNITED STATES PATENT OFFICE 2,529,493

CHLOROALKYL ALKYL SULFITES AS NEW CHEMICALS AND INSECTICIDES

Walter D. Harris, Naugatuck, Herman D. Tate, Woodbridge, and John W. Zukel, Hamden, Conn., assignors to United States Rubber Company, New York, N. Y., a corporation of New Jersey No Drawing. Application October 29, 1948, Serial No. 57,412

18 Claims. (Cl. 167—22)

This invention relates to improvements in insecticides, particularly for the control of mites and aphids.

The insecticides of the present invention are new compounds, namely, the di-esters of sulfurous acid wherein one of the esterifying groups is an alkyl radical containing 7 to 16 carbon atoms and the other esterifying group is a chloroalkyl radical containing 2 to 4 carbon atoms and 1 to 3 chlorine atoms and having no chlorine atom attached to the alpha carbon atom. The reason for the requirement that no chlorine atom be attached to the alpha carbon atom of the chloroalkyl radical is that a chlorine attached to a carbon which is attached to an oxygen, is too reactive. The preparation of these mixed sulfites is conveniently carried out in two steps, (1) reacting the selected chloroalkanol containing 2 to 4 carbon atoms and 1 to 3 chlorine atoms with thionyl chloride to form the chloroalkyl chlorosulfinate, and (2) reacting the chloroalkyl chlorosulfinate with the selected alkanol containing 7 to 16 carbon atoms. It is also possible to prepare the mixed sulfites by reacting the alkanol with thionyl chloride to form the alkyl chlorosulfinate, and then reacting the alkyl chlorosulfinate with the chloroalkanol. It is desirable, but not essential, that the alpha carbon atom of the chloroalkyl radical be attached to at least one hydrogen atom since the chloro-tertiary-butyl esters are somewhat difficult to prepare, particularly the monochloro-tertiary-butyl ester, due to the tendency towards dehydration of the chloro-tertiary butanols in the presence of acidic agents. The preparation of the chemicals of the present invention is illustrated by the following reactions, using the preparation of 2-chloroethyl n-decyl sulfite as an example:

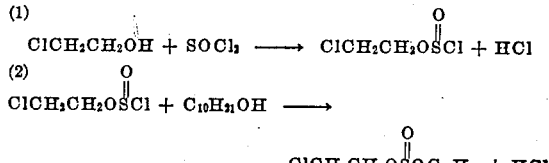

Both steps give good yields. The ethylenechlorohydrin in the first step may be substituted by ethylene oxide. The intermediate chlorosulfinates obtained in the first step are somewhat unstable, decomposing to sulfur dioxide and the polyhaloalkane (ethylene chloride in the above preparation). They are, however, stable enough that they can be distilled under reduced pressure and stored for a short period with only slight decomposition. The second step is conveniently carried out in the presence of a proton acceptor such as pyridine, dimethylaniline, or trimethylamine to sequester the hydrogen chloride, and in a solvent such as benzene, xylene or solvent naphtha. A wide variation in temperature is possible but temperatures between 20° C. and 50° C. are most convenient. The pyridine or other hydrogen chloride sequestering agent may be omitted if the reaction is carried out under reduced pressure or in the presence of a dry inert gas such as air or nitrogen.

Examples of sulfurous acid di-esters of the present invention where the chloroalkyl radical contains one chlorine atom are:

2-chloroethyl n-heptyl sulfite
2-chloroethyl n-octyl sulfite
2-chloroethyl 2-ethyl-n-hexyl sulfite
2-chloroethyl 1-methyl-n-heptyl sulfite
2-chloroethyl n-nonyl sulfite
2-chloroethyl 1-methyl-n-octyl sulfite
2-chloroethyl 1-propyl-n-amyl sulfite
2-chloroethyl n-decyl sulfite
2-chloroethyl n-undecyl sulfite
2-chloroethyl 1-methyl-4-ethyl-n-octyl sulfite
2-chloroethyl n-dodecyl sulfite
2-chloroethyl n-tridecyl sulfite
2-chloroethyl n-tetradecyl sulfite
2-chloroethyl 1-isobutyl-4-ethyl-n-octyl sulfite
2-chloroethyl n-pentadecyl sulfite
2-chloroethyl n-hexadecyl sulfite
3-chloropropyl n-octyl sulfite
3-chloropropyl 2-ethyl-n-hexyl sulfite
3-chloropropyl 1-methyl-n-heptyl sulfite
3-chloropropyl n-nonyl sulfite
3-chloropropyl 1-methyl-n-octyl sulfite
3-chloropropyl 1-propyl-n-amyl sulfite
3-chloropropyl n-decyl sulfite
3-chloropropyl n-undecyl sulfite
3-chloropropyl 1-methyl-4-ethyl-n-octyl sulfite
3-chloropropyl n-dodecyl sulfite
3-chloropropyl n-tridecyl sulfite
3-chloropropyl n-tetradecyl sulfite
3-chloropropyl 1-isobutyl-4-ethyl-n-octyl sulfite
3-chloropropyl n-pentadecyl sulfite
3-chloropropyl n-hexadecyl sulfite
1-methyl-2-chloroethyl n-octyl sulfite
1-methyl-2-chloroethyl 2-ethyl-n-hexyl sulfite
1-methyl-2-chloroethyl 1-methyl-n-heptyl sulfite
1-methyl-2-chloroethyl n-nonyl sulfite
1-methyl-2-chloroethyl n-decyl sulfite
1-methyl-2-chloroethyl n-undecyl sulfite
1-methyl-2-chloroethyl 1-methyl-4-ethyl-n-octyl sulfite
1-methyl-2-chloroethyl n-dodecyl sulfite
1-methyl-2-chloroethyl n-tridecyl sulfite
1-methyl-2-chloroethyl n-tetradecyl sulfite
1-methyl-2-chloroethyl 1-isobutyl-4-ethyl-n-octyl sulfite
1-methyl-2-chloroethyl n-pentadecyl sulfite
1-methyl-2-chloroethyl n-hexadecyl sulfite
2-chloropropyl n-decyl sulfite
2-chloropropyl n-dodecyl sulfite
2-chlorobutyl n-decyl sulfite 2-chlorobutyl n-dodecyl sulfite
3-chlorobutyl n-decyl sulfite
3-chlorobutyl n-dodecyl sulfite
4-chlorobutyl n-decyl sulfite
4-chlorobutyl n-dodecyl sulfite
3-chloro-isobutyl n-decyl sulfite
3-chloro-isobutyl n-dodecyl sulfite
1-chloromethyl-propyl n-decyl sulfite
1-chloromethyl-propyl n-dodecyl sulfite
1-methyl-2-chloropropyl n-decyl sulfite
1-methyl-2-chloropropyl n-dodecyl sulfite Other examples of the sulfurous acid di-esters of the present invention are the various esters having the same alkyl radicals as the above esters but with the mono-chloroalkyl radicals of the above esters substituted by chloroalkyl radicals having 2 and 3 chlorine atoms, for example, 2,2-dichloroethyl, 2,2,2-trichloroethyl, 2,3-dichloropropyl, 1-chloromethyl-2-chloroethyl, 2,2-dichloropropyl, 3,3-dichloropropyl, 3,3,3-trichloropropyl, 2,3-dichlorobutyl, 2,4-dichlorobutyl, 3,4-dichlorobutyl, 1,1 - dimethyl - 2,2,2 - tricholorethyl radicals.

Specific illustrative examples of the preparation of the compounds of the present invention are shown in Examples I to IX below.

EXAMPLE I

*Preparation of 2-chloroethyl lauryl sulfite*

Thionyl chloride (70 g.) was added to ethylene chlorohydrin (40 g.) at such rate that the temperature did not rise above 35° C. Hydrogen chloride was evolved rapidly. The mixture was allowed to stand for two days protected from the moisture of the air by a calcium chloride tube. The reaction mixture was fractionally distilled, yielding 72 g. of 2-chloroethyl chlorosulfinate, a water-white liquid boiling at 90–94° C./30 mm. This product tends to darken on standing at room temperature and fumes in the air. It is hydrolyzed immediately with water. It may, however, be stored with only slight decomposition for short periods.

A solution containing technical lauryl alcohol (458 g.) and pyridine (237 g.) in 900 cc. of dry benzene was placed in a flask equipped with agitator and dropping funnel. The solution was cooled in a water bath and agitated while 2-chloroethyl chlorosulfinate (489 g.) was added through the dropping funnel. Addition of the 2-chloroethyl chlorosulfinate was at such a rate that the temperature did not rise above 40° C. About 40 minutes was required for this addition. Stirring was continued for another 15 minutes. The pyridine hydrochloride was removed by suction filtration. The filtrate was washed five times with tap water and finally once with a 5% sodium bicarbonate solution. The solution was dried over sodium sulfate, filtered and transferred to a distillation apparatus. The product was distilled under reduced pressure. The main fraction, 2-chloroethyl lauryl sulfite (350 g., 52% yield), was collected at 168–170° C./1 mm. It was a water-white, mobile, almost odorless liquid. Refractive index, $n]_D^{20}$ 1.4589. Analysis calculated as $C_{14}H_{29}O_3SCl$, per cent Cl 11.36, per cent S 10.25; found 11.22% Cl, 10.17% S. The residue (112 g.) was a dark, mobile, almost odorless liquid. Refractive index, $n]_D^{20}$ 1.4608. Analysis found 9.08% Cl, 8.99% S. Refractive index and analysis indicates that this residue consists principally of a mixture of 2-chloroethyl alkyl sulfites in which the alkyl group contains more than 12 carbon atoms.

EXAMPLE II

*Preparation of 2-chloroethyl n-decyl sulfite*

To a rapidly stirred solution of 316 g. of n-decyl alcohol and 154 g. of pyridine in 600 cc. of dry benzene was added 326 g. of 2-chloroethyl chlorosulfinate prepared as in Example I. The reaction mixture was cooled in a water bath and the rate of addition of the 2-chloroethyl chlorosulfinate was controlled so that the temperature did not rise above 40° C. Stirring was continued without cooling for an additional 10 minutes. The reaction mixture was washed 5 times with water and the solvent and low boiling impurities were removed under reduced pressure. The fraction which distilled below 149° C./3 mm. was discarded. A yield of 440 g. of straw colored liquid was obtained. Refractive index, $n]_D^{22}$ 1.4550. 164 g. of the crude product described above was distilled under reduced pressure. The main fraction (122 g.) boiled at 154–160° C./0.7 mm. Refractive index, $n]_D^{23}$ 1.4542. On redistillation, the 2-chloroethyl n-decyl sulfite boiled at 145–147° C./0.5 mm. Refractive index, $n]_D^{22}$ 1.4529.

EXAMPLE III

*Preparation of 3-chloropropyl lauryl sulfite*

Thionyl chloride (134 g.) and trimethylene chlorohydrin (94.5 g.) were reacted in the manner of the thionyl chloride and ethylene chlorohydrin in Example I. A yield of 162.5 g. (92%) of 3-chloropropyl chlorosulfinate, a colorless liquid boiling at 104–107° C./30 mm., was obtained. The product had properties similar to the 2-chloroethyl analog.

Lauryl alcohol (tech. 18.6 g.) and pyridine (7.9 g.) were dissolved in 100 cc. of dry ether. 3-chloropropyl chlorosulfinate (17.7 g.) was added at such a rate that the ether refluxed gently. The reaction mixture was stirred during the addition, and for one-half hour thereafter. The precipitate of pyridine hydrochloride was removed by filtering rapidly under suction. The filtrate was dried over anhydrous sodium sulfate, concentrated and distilled under reduced pressure. The product was collected as a colorless oil at 155–160° C./0.5 mm. Refractive index, $n]_D^{20}$ 1.4590. Yield 15 g. On redistillation the 3-chloropropyl lauryl sulfite boiled at 157–159° C./0.5 mm. Refractive index, $n]_D^{20}$ 1.4550.

EXAMPLE IV

*Preparation of 4-chlorobutyl n-decyl sulfite*

Carbon tetrachloride (300 cc.) was refluxed in a flask fitted with a stirrer, reflux condenser and two dropping funnels while thionyl chloride (238 g.) and 4-chlorobutyl alcohol (108 g.) were added in such a way that there was always an excess of thionyl chloride. The reaction mixture was refluxed for one hour. Solvent and excess thionyl chloride were removed under reduced pressure and the product was fractionated under reduced pressure. A yield of 60 g. of 4-chlorobutyl chlorosulfinate, a water-white liquid which boiled at 95–100° C./10 mm., was obtained. In addition 40 g. of di-4-chlorobutyl sulfite, B. P. 145–155° C./1 mm. was also obtained.

n-Decyl alcohol (15.8 g.) and pyridine (7.9 g.) were dissolved in 100 cc. of dry ether. 4-chlorobutyl chlorosulfinate (19.1 g.) was added at such a rate that the ether refluxed gently. The reaction mixture was stirred during the addition and for one-half hour thereafter. The precipitate of pyridine hydrochloride was removed by filtering rapidly under suction. The filtrate was dried over anhydrous sodium sulfate, concentrated and distilled under reduced pressure. The product boiling at 140°–165° C./1 mm. was collected. Yield 6.5 g. of light yellow oil. On redistillation, the 4-chlorobutyl n-decyl sulfite was a water-white oil boiling at 146°–149° C./0.6 mm. Refractive index, $n]_D^{20}$ 1.4491.

EXAMPLE V

*Preparation of 1-methyl-2-chloroethyl n-decyl sulfite*

1-methyl-2-chloroethyl chlorosulfinate was prepared by reacting thionyl chloride (140 g.) with propylene chlorohydrin (94 g.) according to the procedure described in Example I. A 146 g. yield of a colorless liquid distilling at 57–9° C./3 mm. was obtained.

The sulfite was prepared by reacting the above chlorosulfinate (26.7 g.) decyl alcohol (23.8 g.) and pyridine (12 g.) in dry ether (150 cc.) according to the procedure described in Example I. A yield of 13.5 g. of a yellow liquid which boiled at 146–148° C./1 mm. was obtained. Refractive index, $n]_D^{21}$ 1.4534. Analysis: theory 11.89% Cl; found 11.97% Cl.

EXAMPLE VI

*Preparation of 1-chloromethyl-2-chloroethyl n-heptyl sulfite*

1-chloromethyl-2-chloroethyl chlorosulfinate was prepared by reacting 1,3-dichloropropanol-2 (129 g.) with thionyl chloride (140 g.) according to the procedure described in Example I. A 168 g. yield of colorless product was collected at 95–100° C./10 mm.

The sulfite was prepared by reacting the above chlorosulfinate (21.1 g.), heptyl alcohol (11.6 g.) and pyridine (7.9 g.) in 100 cc. of dry ether according to the procedure described in Example I. A yield of 13.5 g. of a colorless liquid which distilled at 145–150° C./1.5 mm. was isolated. Refractive index, $n]_D^{21}$ 1.4686.

EXAMPLE VII

*Preparation of 2,3-dichloropropyl decyl sulfite*

2,3-dichloropropyl chlorosulfinate was prepared by reacting technical glyceroldichlorohydrin (129 g.) and thionyl chloride (140 g.) according to the procedure described in Example I, yielding 187 g. of a colorless liquid which boiled at 73–75° C./1.5 mm.

The sulfite was prepared by reacting the above chlorosulfinate (32 g.) with decyl alcohol (24 g.) and pyridine (12 g.) in dry ether (250 cc.) according to the procedure described in Example I. Thirty-five grams of a yellow liquid which boiled at 175–177° C./2 mm. was obtained. Refractive index, $n]_D^{24}$ 1.4672.

EXAMPLE VIII

*Preparation of 2,2,2-trichloroethyl n-octyl sulfite*

2,2,2-trichloroethyl chlorosulfinate was prepared from 2,2,2-trichloroethyl alcohol (75 g.) and thionyl chloride (70 g.) by the procedure described in Example I. A yield of 71 g. of product boiling at 80–85° C./10 mm. was obtained.

The sulfite was prepared by reacting the above chlorosulfinate (23.2 g.) with octyl alcohol (13 g.) and pyridine (7.9 g.) in 100 cc. of ether according to the procedure described in Example I. A yield of 15.5 g. of the desired product boiling at 158–165° C./3 mm. was obtained. Refractive index $n]_D^{22}$ 1.4678.

EXAMPLE IX

*Preparation of 1,1-dimethyl-2,2,2-trichloroethyl n-decyl sulfite*

Decylchlorosulfinate was prepared by adding thionyl chloride (65 cc.) slowly with stirring to decyl alcohol (100 g.). The reaction mixture was cooled in an ice-water bath throughout the addition. Stirring was continued for 42 hours at room temperature. Thereafter the reaction flask was subjected to a vacuum (water aspirator) for 1 hour. The resulting solution was then topped to a pot temperature of 55° C. at 10 mm. for a few minutes, but no attempt was made to distill this product because of its thermal instability. This product (38.4 g.) was reacted with 1,1-dimethyl-2,2,2-trichloroethyl alcohol (25.6 g.) and pyridine (11.9 g.) in 150 cc. of benzene by the procedure described in Example I, except that the product was topped to a vapor temperature of 70° C. at 10 mm. but not distilled. Yield 16 g. pale yellow liquid. Refractive index, $n]_D^{22}$ 1.4620.

Boiling points and refractive indices of the above sulfite esters and various other sulfite esters prepared in the manner of the above examples are shown in the table below:

*Table I*

| Sulfite | Boiling Point | Refractive Index (D line) |
|---|---|---|
| 2-chloroethyl n-heptyl | 95–100° C./1 mm | |
| 2-chloroethyl 1-methyl-n-heptyl | 108–110° C./0.5 mm | 1.4525 at 20° C. |
| 2-chloroethyl 2-ethyl-n-hexyl | 105–107° C./0.5 mm | 1.4573 at 20° C. |
| 2-chloroethyl n-decyl | 145–147° C./0.5 mm | 1.4529 at 22° C. |
| 2-chloroethyl n-undecyl | 150–152° C./0.5 mm | 1.4548 at 19° C. |
| 2-chloroethyl 1-methyl-4-ethyl-n-octyl | 118–120° C./0.3 mm | 1.4558 at 20° C. |
| 2-chloroethyl lauryl | 168–170° C./1 mm | 1.4589 at 20° C. |
| 2-chloroethyl tetradecyl | 163–165° C./0.3 mm | 1.4573 at 20° C. |
| 2-chloroethyl 1-isobutyl-4-ethyl-1-octyl | Topped to 195° C./0.5 mm | 1.4519 at 27.5° C. |
| 2-chloroethyl hexadecyl | Topped to 165° C./2 mm | 1.4609 at 23° C. |
| 3-chloropropyl n-octyl | 111–115° C./1 mm | |
| 3-chloropropyl n-decyl | 147–149° C./0.5 mm | 1.4540 at 20° C. |
| 3-chloropropyl lauryl | 157–159° C./0.5 mm | 1.4550 at 20° C. |
| 3-chloropropyl tetradecyl | 178–180° C./0.5 mm | 1.4575 at 20° C. |
| 4-chlorobutyl n-decyl | 146–149° C./0.6 mm | 1.4491 at 20° C. |
| 4-chlorobutyl lauryl | Topped to 165° C./1 mm | |
| 4-chlorobutyl tetra-decyl | Topped to 130° C./1 mm | |
| 1-methyl-2-chloroethyl 1-methyl-n-heptyl | 125–128° C./2 mm | 1.4493 at 26° C. |
| 1-methyl-2-chloroethyl n-decyl | 146–148° C./1 mm | 1.4534 at 21° C. |
| 1-methyl-2-chloroethyl n-undecyl | 165–170° C./2.5 mm | 1.4540 at 25° C. |
| 1-methyl-2-chloroethyl n-lauryl | 165–167° C./1 mm | 1.4529 at 20° C. |
| 1-chloromethyl-2-chloro-ethyl n-heptyl | 145–150° C./1.5 mm | 1.4686 at 21° C. |
| 1-chloromethyl-2-chloro-ethyl n-decyl | 168–172° C./2 mm | 1.4658 at 20° C. |
| 1-chloromethyl-2-chloro-ethyl n-lauryl | Topped to 160° C./2.5 mm | 1.4646 at 22° C. |
| 2,3-dichloropropyl n-heptyl | 145–147° C./1.5 mm | 1.4700 at 24° C. |
| 2,3-dichloropropyl 1-methyl-n-heptyl | 150–152° C./2.5 mm | 1.4665 at 24° C. |
| 2,3-dichloropropyl n-decyl | 175–177° C./2 mm | 1.4672 at 24° C. |
| 2,3-dichloropropyl n-lauryl | 193–195° C./1.8 mm | 1.4682 at 24° C. |
| 2,2,2-trichloroethyl n-octyl | 158–165° C./3 mm | 1.4678 at 22° C. |
| 2,2,2-trichloroethyl n-decyl | 185–195° C./5 mm | 1.4659 at 18° C. |
| 2,2,2-trichloroethyl n-undecyl | 160–165° C./1.5 mm | 1.4625 at 26° C. |
| 1,1-dimethyl-2,2,2-trichloroethyl n-decyl | Topped to 70° C./10 mm | 1.4620 at 22° C. |

The following illustrates the effectiveness of the chemicals of the invention for controlling the Greenhouse red spider mite (*Tetranychus telarius*).

In the tests on various chemicals of the present invention against Greenhouse red spider mites, two types of tests were run, a so-called twenty-four hour test, and a so-called forty-eight hour test. In the twenty-four hour tests pinto bean leaves infested with Greenhouse red spider mites were placed on blotters in separate petri dishes and sprayed with aqueous emulsions of the selected chemicals at the various concentrations desired. The emulsions of the chemicals were prepared with small amounts of a commercial surface-active emulsifying agent comprising the reaction product of castor oil and ethylene oxide then added to a 1–3200 concentration of a wetting agent comprising dodecyl benzene sodium sulfonate, both known to be non-toxic to the organisms under test at the concentrations used. After drying in air, the covers were placed on the petri dishes and they were set aside for 24 hours, after which counts were made to determine the kill of mites. These were reported as percent mortality of mites. In the forty-eight hour tests, rings of an adhesive preparation non-toxic to the organisms under test, such as is used on fly papers and for ringing trees, were placed around the borders of the upper surfaces of the leaves of growing pinto bean plants which were at the two-leaf stage. Greenhouse red spider mites were transferred to the thus treated leaves by placing infested bean leaves within the border of the adhesive preparation for 24 hours to effect transfer of the mites. The plants thus infested were then sprayed with aqueous emulsions of the various chemicals of the invention at the selected concentrations. The emulsions of the chemicals were prepared with small amounts of a commercial dispersing agent comprising the reaction product of castor oil and ethylene oxide, and known to be non-toxic to the organisms under test at the concentration used. Observations were made after 48 hours to determine the kill of the mites. The results were reported as percent mortality. The results of the twenty-four and forty-eight hour tests on the various chemicals of the present invention are shown in the table below:

*Table II*

| Chemical of the Invention | Concentration | Per Cent Mortality of Mites | |
|---|---|---|---|
| | | 24 hr. test | 48 hr. test |
| 2-chloroethyl n-heptyl sulfite | 1:800 | | 98 |
| 2-chloroethyl 1-methyl-n-heptyl sulfite | 1:1600 | | 100 |
| 2-chloroethyl 2-ethyl-n-hexyl sulfite | 1:1600 | | 100 |
| 2-chloroethyl n-decyl sulfite | 1:800 | 100 | 100 |
| Do | 1:3200 | | 93 |
| 2-chloroethyl n-undecyl sulfite | 1:1600 | | 100 |
| 2-chloroethyl 1-methyl-4-ethyl-n-octyl sulfite | 1:1600 | | 100 |
| 2-chloroethyl lauryl sulfite | 1:800 | 100 | 100 |
| Do | 1:6400 | | 98 |
| 2-chloroethyl tetradecyl sulfite | 1:800 | | 100 |
| Do | 1:3200 | | 86 |
| 2-chloroethyl 1-isobutyl-4-ethyl-n-octyl sulfite | 1:1600 | | 100 |
| 2-chloroethyl hexadecyl sulfite | 1:1600 | | 100 |
| 3-chloropropyl n-octyl sulfite | 1:400 | | 100 |
| 3-chloropropyl n-decyl sulfite | 1:800 | 100 | 96 |
| Do | 1:1600 | | 95 |
| 3-chloropropyl lauryl sulfite | 1:800 | 100 | 100 |
| Do | 1:6400 | | 97 |
| 3-chloropropyl tetradecyl sulfite | 1:800 | 99 | 100 |
| Do | 1:1600 | | 100 |
| 4-chlorobutyl n-decyl sulfite | 1:400 | 100 | 100 |
| 4-chlorobutyl lauryl sulfite | 1:400 | 89.9 | 100 |
| 1-methyl-2-chloroethyl 1-methyl-n-heptyl sulfite | 1:800 | | 95 |
| 1-methyl-2-chloroethyl n-decyl sulfite | 1:800 | | 100 |
| Do | 1:1600 | 96 | |
| 1-methyl-2-chloroethyl n-undecyl sulfite | 1:1600 | | 100 |
| 1-methyl-2-chloroethyl lauryl sulfite | 1:400 | | 100 |
| 1-chloromethyl-2-chloroethyl n-heptyl sulfite | 1:1600 | | 93 |
| 1-chloromethyl-2-chloroethyl n-decyl sulfite | 1:3200 | | 100 |
| 1-chloromethyl-2-chloroethyl lauryl sulfite | 1:800 | | 94 |
| 2,3-dichloropropyl n-heptyl sulfite | 1:6400 | | 98 |
| 2,3-dichloropropyl 1-methyl-n-heptyl sulfite | 1:6400 | | 100 |
| 2,3-dichloropropyl n-decyl sulfite | 1:6400 | | 100 |
| 2,3-dichloropropyl lauryl sulfite | 1:3200 | | 100 |
| Do | 1:6400 | | 93 |
| 2,2,2-trichloroethyl n-octyl sulfite | 1:800 | | 100 |
| 2,2,2-trichloroethyl n-decyl sulfite | 1:1600 | | 94 |
| 2,2,2-trichloroethyl n-undecyl sulfite | 1:1600 | | 100 |
| 1,1-dimethyl-2,2,2-trichloroethyl n-decyl sulfite | 1:800 | | 100 |
| Do | 1:1600 | | 90 |

The extreme importance of the two specific esterifying groups in the sulfite esters in the present invention is attested to by the relative inactivity against *Tetranychus telarius* of very closely related compounds. For example, the following shows the ineffectiveness against Greenhouse red spider mites of di-esters of sulfurous acid outside the present invention. Ethyl lauryl sulfite at a concentration of 1:800 gave only 28% kill of mites in the twenty-four hour test. Dilauryl sulfite, which is a prior art insecticide, gave only 38% and 25% kill of Greenhouse red spider mites at concentrations of 1:400 and 1:800 respectively, in the forty-eight hour test. Di(2-chloroethyl) sulfite, which is also a prior art insecticide, gave only 16% mortality of the mites at 1:400 concentration in the twenty-four hour test. 2-chloroethyl ethyl sulfite gave only 5% kill of mites at 1:100 concentration in the forty-eight hour test. 2-chloroethyl n-butyl sulfite, which is a prior art compound, gave only 30% kill of mites at 1:400 concentration in the twenty-four hour test.

The following illustrates the effectiveness of the chemicals of the invention for controlling the pea aphid (*Macrosiphum pisi*):

In the tests against pea aphids with various chemicals of the present invention, two types of tests were run, a so-called twenty-four hour test, and a so-called forty-eight hour test. In the twenty-four hour tests, broad bean leaves infested with pea aphids were placed on blotters in separate petri dishes and sprayed with aqueous emulsions of the selected chemicals at the various concentrations. The emulsions of the chemicals were prepared with small amounts of a commercial surface-active emulsifying agent comprising the reaction product of castor oil and ethylene oxide, then added to a 1:3200 concentration of a wetting agent comprising dodecyl benzene sodium sulfonate, both known to be non-toxic to the organisms under test at the concentrations used. After spraying, the covers were placed on the petri dishes and they were set aside for 24 hours, after which counts were made to determine the kill of aphids. These were reported as percent mortality of aphids. In the forty-eight hour tests, broad bean plants, which were at the two-leaf stage, were infested with pea aphids and the plants thus infested were sprayed with aqueous emulsions of the selected chemicals at the various concentrations. These emulsions were prepared with small amounts of a commercial dispersing agent, comprising the reaction product of castor oil and ethylene oxide, and known to be non-toxic to the organisms under test at the concentration used. Observations were made after 48 hours to determine the kill of the aphids. The results were reported as percent mortality. The results of the 24 and 48 hour tests on the various chemicals of the present invention are shown in the table below:

ethyl n-decyl sulfite of the present invention at 1:800 concentration and 98% control of the aphids at 1:3200 concentration, as shown in Table III.

The chemicals of the present invention may be applied in various manners for the control of insects. They may be applied to loci to be protected against insects in undiluted form, or as dusts when admixed with or adsorbed on powdered solid carriers, such as the various mineral silicates, e. g. mica, talc, pyrophyllite and clays, or as liquids or sprays when in a liquid carrier, as in solution in a suitable solvent, or dispersed in a suitable non-solvent medium, for example, water. In protecting plants (the term including plant parts) which are subject to attack by insects, the chemicals of the present invention are preferably applied as aqueous emulsions containing a dispersing agent. The chemicals of the invention may be admixed with powdered solid carriers, such as mineral silicates, together with small amounts of a dispersing agent so that a wettable powder is obtained which may be applied directly to loci to be protected against insects, or which may be shaken up with water, to form a suspension of the chemical (and powdered carrier) in water for application in that form. The chemicals of the present invention may be applied to loci to be protected against insects by the aerosol method. Solutions for the aerosol treatment may be prepared by dissolving the chemical directly in the aerosol carrier which is liquid under pressure but which is a gas at ordinary temperature (e. g.

Table III

| Chemical of the Invention | Concentration | Per Cent Mortality of Aphids | |
|---|---|---|---|
| | | 24 hr. test | 48 hr. test |
| 2-chloroethyl n-heptyl sulfite | 1:400 | | 95 |
| 2-chloroethyl 1-methyl-n-heptyl sulfite | 1:400 | 89 | |
| 2-chloroethyl 2-ethyl-n-hexyl sulfite | 1:200 | 85 | |
| 2-chloroethyl n-decyl sulfite | 1:800 | | 100 |
| Do | 1:3200 | | 98 |
| 2-chloroethyl n-undecyl sulfite | 1:400 | 85 | |
| 2-chloroethyl 1-methyl-4-ethyl-n-octyl sulfite | 1:800 | 69 | |
| 2-chloroethyl lauryl sulfite | 1:800 | 99 | |
| Do | 1:1600 | 75 | |
| 2-chloroethyl tetradecyl sulfite | 1:800 | 98 | |
| Do | 1:1600 | 92 | |
| 2-chloroethyl 1-isobutyl-4-ethyl-n-octyl sulfite | 1:200 | 72 | |
| 2-chloroethyl hexadecyl sulfite | 1:200 | 52 | |
| 3-chloropropyl n-octyl sulfite | 1:200 | 86 | |
| 3-chloropropyl n-decyl sulfite | 1:200 | 83 | |
| 3-chloropropyl lauryl sulfite | 1:400 | 87 | |
| 3-chloropropyl tetradecyl sulfite | 1:800 | 54 | |
| 4-chlorobutyl n-decyl sulfite | 1:400 | 71 | |
| 4-chlorobutyl lauryl sulfite | 1:400 | 57 | |
| 1-methyl-2-chloroethyl n-decyl sulfite | 1:200 | | 89 |
| Do | 1:400 | | 95 |
| 1-chloromethyl-2-chloroethyl n-heptyl sulfite | 1:400 | | 100 |
| Do | 1:1600 | | 89 |
| 1-chloromethyl-2-chloroethyl n-decyl sulfite | 1:400 | | 100 |
| Do | 1:1600 | | 92 |
| 1-chloromethyl-2-chloroethyl n-octyl sulfite | 1:400 | | 81 |
| 2,3-dichloropropyl n-heptyl sulfite | 1:800 | | 94 |
| 2,3-dichloropropyl n-decyl sulfite | 1:800 | | 98 |
| 2,3-dichloropropyl lauryl sulfite | 1:800 | | 91 |
| 2,2,2-trichloroethyl n-heptyl sulfite | 1:800 | | 66 |
| 2,2,2-trichloroethyl n-octyl sulfite | 1:800 | | 98 |
| 2,2,2-trichloroethyl n-decyl sulfite | 1:800 | | 94 |
| 2,2,2-trichloroethyl n-undecyl sulfite | 1:800 | | 98 |
| Do | 1:1600 | 76 | |
| 2,2,2-trichloroethyl lauryl sulfite | 1:200 | | 87 |
| 1,1-dimethyl-2,2,2-trichloroethyl n-decyl sulfite | 1:800 | | 77 |

Forty-eight hour tests against pea aphids made in a manner similar to the tests with 2-chloroethyl n-decyl sulfite above but with 1:800 concentrations of di(2-chloroethyl) sulfite, 2-chloroethyl ethyl sulfite and 2-chloroethyl n-butyl sulfite, gave only 22%, 2% and 27% control of the aphids, respectively, as compared with 100% control of the aphids with the 2-chloro- 20° C.) and atmospheric pressure, or the aerosol solution may be prepared by first dissolving the chemical in a less volatile solvent and then admixing such solution with the highly volatile liquid aerosol carrier. The chemicals may be used admixed with carriers that are active of themselves, for example, other insecticides, fungicides or bactericides.

This application is a continuation-in-part of application Serial No. 794,420, filed December 29, 1947, now abandoned.

Having thus described our invention, what we claim and desire to protect by Letters Patent is:

1. A di-ester of sulfurous acid wherein one of the esterifying groups is a chloroalkyl radical containing 2 to 4 carbon atoms and 1 to 3 chlorine atoms and having no chlorine atom attached to the alpha carbon atom and the other esterifying group is an alkyl radical containing 7 to 16 carbon atoms.

2. A di-ester of sulfurous acid wherein one of the esterifying groups is an alkyl radical containing 7 to 16 carbon atoms and the other esterifying group is a monochloroalkyl radical containing 2 to 4 carbon atoms in which at least one hydrogen atom is attached to the alpha carbon atom and in which the chlorine atom is attached to a carbon atom other than the alpha carbon atom.

3. A di-ester of sulfurous acid wherein one of the esterifying groups is the 2-chloroethyl radical and the other esterifying group is an alkyl radical containing 7 to 16 carbon atoms.

4. A di-ester of sulfurouss acid wherein one of the esterifying groups is the 2,3-dichloropropyl radical and the other esterifying group is an alkyl radical containing 7 to 16 carbon atoms.

5. 2-chloroethyl decyl sulfite.
6. 2-chloroethyl lauryl sulfite.
7. 2,3-dichloropropyl decyl sulfite.
8. 3-chloropropyl lauryl sulfite.
9. 4-chlorobutyl n-decyl sulfite.

10. A composition comprising a di-ester of sulfurous acid wherein one of the esterifying groups is a chloroalkyl radical containing 2 to 4 carbon atoms and 1 to 3 chlorine atoms and having no chlorine atoms attached to the alpha carbon atom and the other esterifying group is an alkyl radical containing 7 to 16 carbon atoms, and a surface-active emulsifying agent.

11. A composition comprising a di-ester of sulfurous acid wherein one of the esterifying groups is an alkyl radical containing 7 to 16 carbon atoms and the other esterifying group is a monochloralkyl radical containing 2 to 4 carbon atoms in which at least one hydrogen atom is attached to the alpha carbon atom and in which the chlorine atom is attached to a carbon atom other than the alpha carbon atom, and a surface-active emulsifying agent.

12. A composition comprising a di-ester of sulfurous acid wherein one of the esterifying groups is the 2-chloroethyl radical and the other esterifying group is an alkyl radical containing 7 to 16 carbon atoms, and a surface-active emulsifying agent.

13. A composition comprising a di-ester of sulfurous acid wherein one of the esterifying groups is the 2,3-dichloropropyl radical and the other esterifying group is an alkyl radical containing 7 to 16 carbon atoms, and a surface-active emulsifying agent.

14. A composition comprising 2-chloroethyl decyl sulfite, and a surface active emulsifying agent.

15. A composition comprising 2-chloroethyl lauryl sulfite, and a surface-active emulsifying agent.

16. A composition comprising 2,3-dichloropropyl decyl sulfite, and a surface-active emulsifying agent.

17. A composition comprising 3-chloropropyl lauryl sulfite, and a surface-active emulsifying agent.

18. A composition comprising 4-chlorobutyl n-decyl sulfite, and a surface-active emulsifying agent.

WALTER D. HARRIS.
HERMAN D. TATE.
JOHN W. ZUKEL.

REFERENCES CITED

The following references are of record in the file of this patent:

UNITED STATES PATENTS

| Number | Name | Date |
|---|---|---|
| 2,377,148 | Hechkenbleikner | May 29, 1945 |

OTHER REFERENCES

Carre et al., "Bull. Soc. Chim., France" 4th ser. vol. 53, part 2 (1933) pp. 1070–1073.

B. I. O. S., Final Report No. 1095 (item 22), "Developments in Methods and Materials for the Control of Plant Pests and Diseases in Germany" dated May–June 1946, released for publication Nov. 7, 1947, page 34.